VARIABLE THRESHOLD CORRELATOR SYSTEM FOR THE SYNCHRONIZATION OF INFORMATION SIGNALS BY A CYCLICALLY REPEATED SIGNAL GROUP

Filed March 18, 1966 3 Sheets-Sheet 1

Aug. 26, 1969 J. DUPRAZ ET AL 3,463,911

VARIABLE THRESHOLD CORRELATOR SYSTEM FOR THE SYNCHRONIZATION OF INFORMATION SIGNALS BY A CYCLICALLY REPEATED SIGNAL GROUP

Filed March 18, 1966 3 Sheets-Sheet 3

United States Patent Office 3,463,911
Patented Aug. 26, 1969

3,463,911

VARIABLE THRESHOLD CORRELATOR SYSTEM FOR THE SYNCHRONIZATION OF INFORMATION SIGNALS BY A CYCLICALLY REPEATED SIGNAL GROUP

Jacques Dupraz and Thaddeus Hawkes, Paris, France, assignors to CSF-Compagnie Generale de Telegraphie Sans Fil, a corporation of France Filed Mar. 18, 1966, Ser. No. 535,416
Claims priority, application France, Apr. 6, 1965, 12,176
Int. Cl. G06g *7/19;* G06f *15/34, 15/20*
U.S. Cl. 235—181 6 Claims

ABSTRACT OF THE DISCLOSURE

A variable threshold correlator for the synchronization of a continuous flow of information signals by a cyclically repeated predetermined signal group comprising a correlator for correlating this flow of signals with this predetermined group and a memory for storing the correlation signal provided by the correlator. A logical circuit controlled by a comparator transmits the correlation signal from the correlator to the memory when this signal rises to a value higher than the stored value. A counter reset to zero by the comparator provides the synchronization pulses, these pulses also controlling the inscription of the correlation signal in the memory.

The present invention relates to pulse coded information transmission systems, such as telemetering systems, which provide an uninterrupted flow of binary information elements. As transmitted, this flow is divided into cycles each of which is formed by a preselected identification signal group and an information signal group, for example a measuring signal group.

At the receiving end, this message undergoes restoring, shaping and synchronization operations so as to permit the separation and decoding of the information signal groups. The synchronization operation consists of a step-by-step analysis of the message in order to detect the position of the identification signal group which indicates the start of an information signal group. To this end, the message passes through a correlator in which the signal identification group to be identified is permanently stored. At the output of the correlator is found a signal, the amplitude of which is a measure of the number of coincidences taking place between the message section being considered at a given instant by the correlator and the signal group stored therein.

Basically, it suffices to have, in series with the correlator, a rejector circuit whose threshold is adjusted to pass only the maximal correlation signal.

However, because of the noise which may alter the content of the message, the cyclic synchronization method based on a fixed threshold may be unreliable because the selected threshold may happen to be too high so that no correlation signal is passed at all. This drawback may be reduced by lowering the rejection threshold when the transmission conditions deteriorate. But this has to be done by a skilled operator and generally results in a cyclic synchronization which is hardly reliable, since if the threshold is too low false localizations of the identification signal group may take place.

It is an object of this invention, to provide a variable threshold correlator system of the above type which is free of this drawback.

For a better understanding of the invention and to show how the same may be carried into effect reference will be made to the drawing accompanying the following description and in which.

Figure 1:
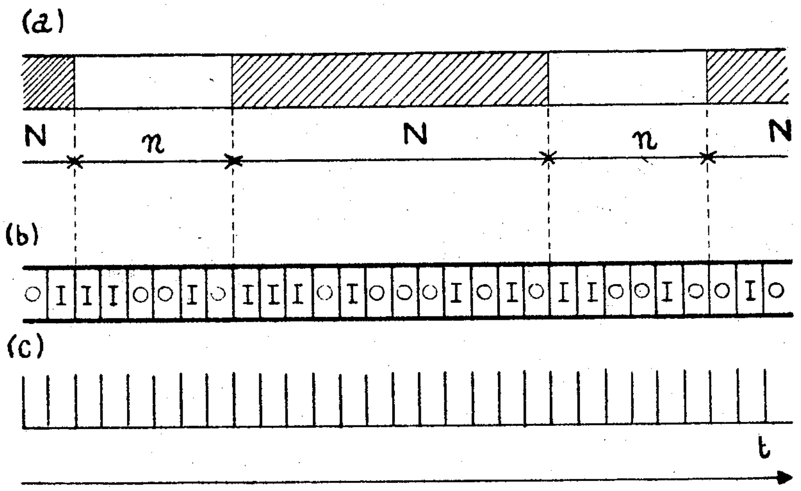
FIG. 1 is an explanatory drawing.

FIG. 1 shows diagrammatically as a function of the time the cyclic structure (*a*) of a pulse-coded telemetering message. This message comprises alternatively $n$ preselected elements or digits forming the identification signal group and N information elements or digits representing the metering signal group. By way of example, the composition of such a message is shown at (*b*) and it can be seen that the identification signal group forms the preselected digit sequence 110010. Each binary digit corresponds to one interval, the message being transmitted step-by-step at the repetition rate of the primary sync pulses shown under (*c*).

The uninterrupted flow of binary digits (*b*) and the synchronizing pulses (*c*) are available in the telemetering receiver and the problem is to check the cyclic signal sequence shown at (*a*).

Figure 2:
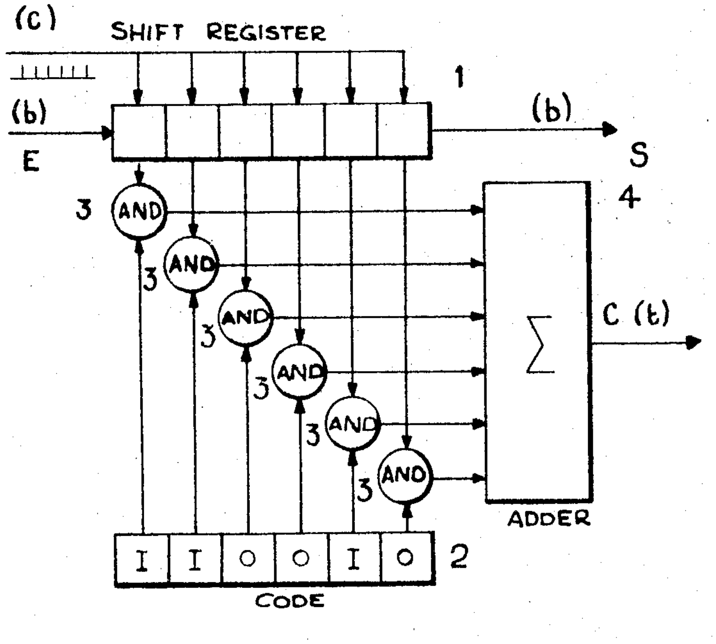
FIG. 2 is a block diagram of a correlator of a known design.

To this end, the message passes through a correlator, such as that shown in FIG. 2. It comprises a shift register 1, whose operation is controlled by the synchronizing pulses. The binary digits pass through the register 1, each stage of which is connected to one input of a coincidence circuit 3, whose other input receives one of the digits of the identification signal sequence 110010. The respective outputs of the circuits 3 are connected to a summing circuit 4 which supplies the correlation signal $C(t)$.

The amplitude of the correlation signal $C(t)$ varies step-by-step according to the number of coincidences between the identification digits and the digits stored in the register 2. When there is full coincidence between the digit sequence stored in register 1 and that stored in register 2, i.e. when the correlator is comparing the $n$ binary digits forming the identification signal group, with the same signal group as stored in register 2, the amplitude of the correlation signal is at a maximum. Of course, a prerequisite to that is that no alteration of the message has occurred during the transmission thereof.

Figure 3:
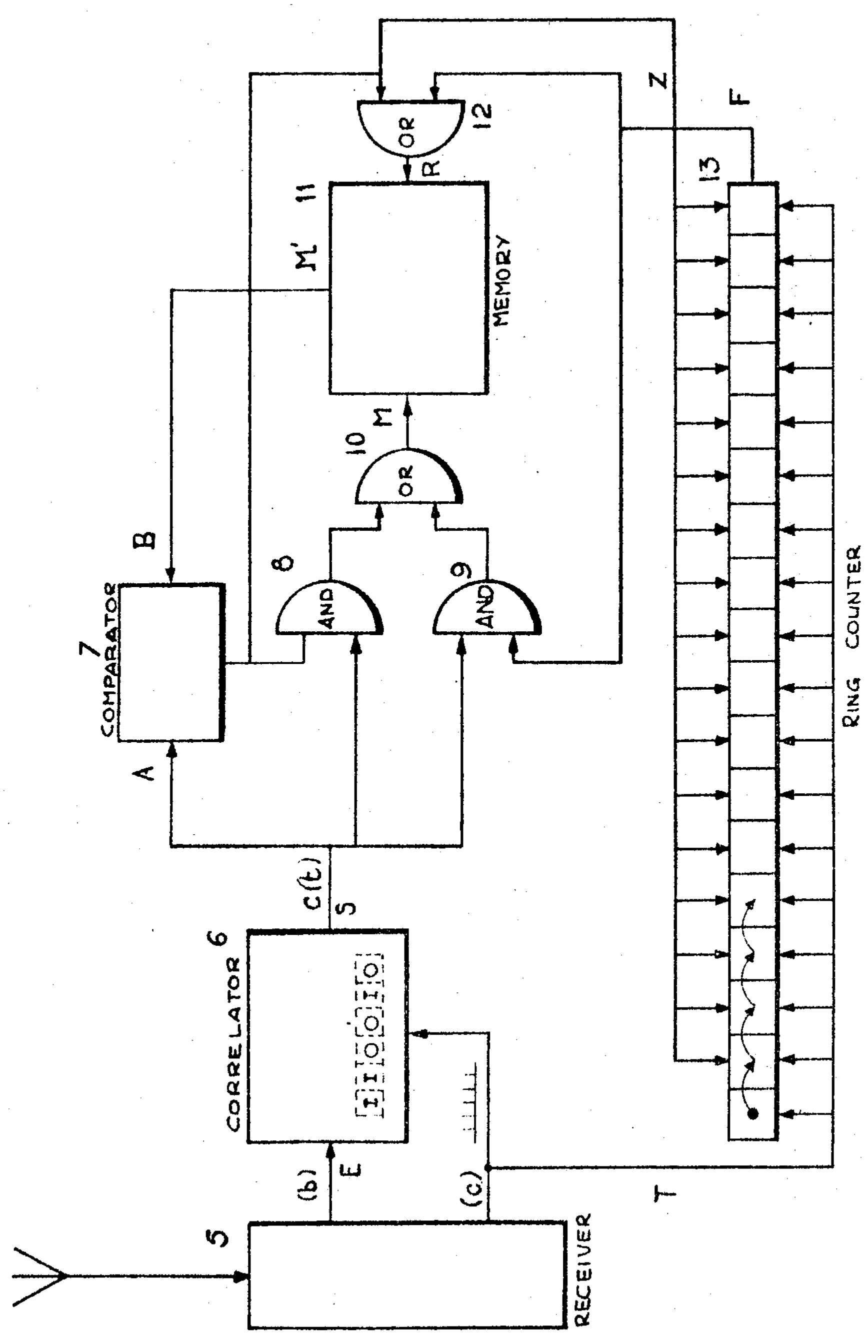
FIG. 3 is a block diagram of a correlator according to the invention.

FIG. 3 shows a part of a telemetering receiver 5 which carries out restoring, shaping and synchronization of the received signals and supplies a correlator system according to the invention with signals (*b*) and (*c*) of FIG. 1.

The correlator system, shown diagrammatically in FIG. 3 comprises a correlator 6, such as that shown in FIG. 2. It supplies a correlation signal $C(t)$ whose successive values are compared with each other by means of a comparator 7 and a memory 11, as will be explained hereinafter in more detail. The correlation signal reaches the memory 11 through two AND-gates 8 and 9 whose outputs are connected to an OR-gate 10. AND-gate 8 has its other input connected to the output of the comparator 7. AND-gate 9 has its other input connected to the output of a ring counter 13 actuated by the pulse train (*c*) having a shift input T. The output of the comparator 7 and the output F of the counter 13 are also applied to an OR-gate whose output controls the erasure input R of the memory 11. The resetting to zero of the counter 13 is controlled by the output of the comparator 7 through a zero reset input Z.

The system operates as follows.

At the start, the memory 11 is empty, so that no signal is applied to the input B of the comparator 7. The correlator 6 applies a first correlation signal to the input A of the comparator 7. Since the input A receives a signal having a higher amplitude than the input B, the comparator 7 transmits a control pulse to the AND-circuit 8 which passes the correlation signal C($t$), to memory 11 which stores it. Since the comparison threshold level applied to the input B of the comparator 7 has the value of the level stored in memory 11, it is necessary to wait until the input A receives a signal having a higher level for the comparator 7 to transmit a further control pulse. When this happens, the comparator 7 acts through the circuit 12 to erase the memory and through circuits 8 and 10 to store therein the new value which then appears at the input B of the comparator 7. This process of erasing and storing is repeated each time the correlation signal exceeds the previously stored threshold. Then an equilibrium is reached when the threshold can no longer be exceeded.

In order to limit in time the operation of the system, once the maximum threshold has been reached, the system according to the invention includes a cyclic counter 13 with as many stages as there are information elements in one message cycle: thus, $n$ being the number of binary digits building up the identification signal and N the number of binary digits building up the metering signal, the counter 13 has $n+N$ stages.

When a comparison threshold level has been exceeded, the comparator 7 orders not only the erasure of the memory 11, but also the resetting to zero of the counter 13. Since the counter is actuated by the pulse train ($c$), it measures the period of time which passes between two successive oversteppings of the threshold stored in the memory 11. When this period of time actually reaches the duration $n+N$ digit intervals of the cycle, the last stage of the counter 13 transmits a pulse which erases the memory 11 through the OR-gate 12. At the same time, this pulse energizes the AND-gate 9 which opens the passage to the latest level of the correlation signal C($t$), which is then stored in the memory 11.

Thus due to the counter arrangement, the variable threshold stored in the memory 11 may be lowered if the counter has performed a complete cycle of operation. The pulses provided at the output F of the counter 13 are the synchronization pulses for the decoding part of the telemetering receiver (not shown) since they indicate the beginnings of the metering signals at the output E of part 5 of the telemetering receiver.

Figure 4:
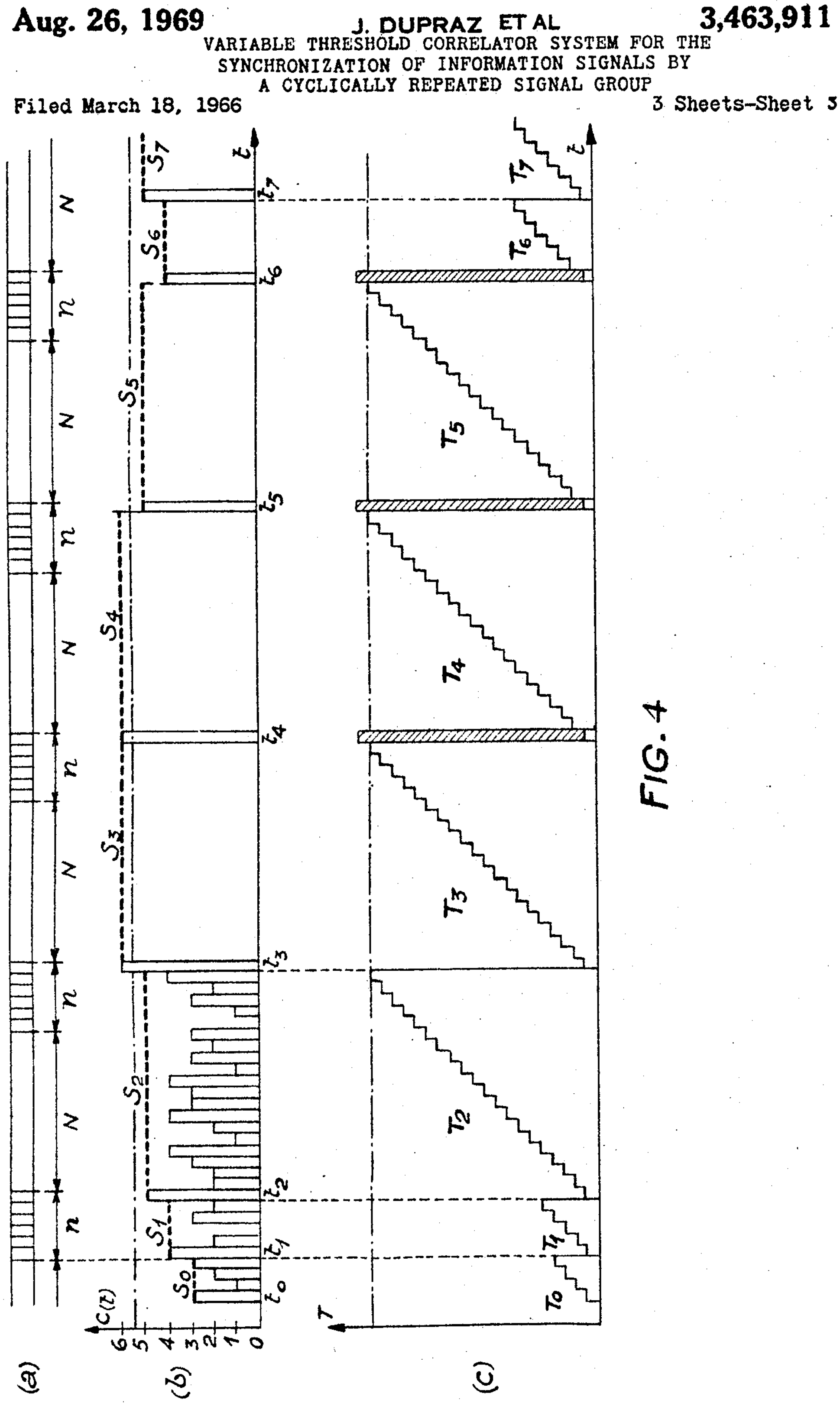
FIG. 4 is an explanatory diagram.

FIG. 4 shows an operating diagram of a correlation system according to the invention. The cyclic structure of the message, which comprises alternatively $n$ binary digits forming the identification signal group and N binary digits forming the information signal group, is diagrammatically shown at ($a$). By way of example, the identification signal group has 6 digits which are repeated at the end of the information digits of the information signal group.

The signal C($t$), supplied by the correlator is shown at ($b$). This signal, as represented, consists of vertical bands with a width equal to one message interval and with a height or amplitude comprised between 0 and $n$. By way of example, reading this signal from left to right, it is seen that successively 3, 1, 2, 3 and 4 . . . coincidences have been obtained while the received message digits were confronted with the identification signal group digits stored in the correlator 6.

The counting which take place in counter 13 during the operation of the correlator system of the invention are shown at ($c$).

At the initial instant $t_0$, the memory is assumed to be empty, that is to say, the threshold level is zero. The system starts a search phase from this instant $t_0$, which may be any instant within the message cycle. The first correlation signal has the value 3. It is stored in the memory 11 due to the order pulse supplied by the comparator 7. This pulse also resets to zero counter 13 which starts a fresh counting cycle. Up to the moment $t_1$, the stored threshold, represented by the dotted level $S_0$, remains at the level 3. The counter count is represented by the staggered line $T_0$. At the moment $t_1$, the threshold $S_0$ is exceeded and the comparator 7 orders a new entry into the memory 11. As the threshold level reaches the valve $S_1$, the counter, which has been reset to zero, resumes a new counting cycle represented by the staggered line $T_1$. At the moment $t_2$, the threshold is again exceeded and the level becomes $S_2$: the counter resumes the count along $T_2$. At the moment $t_3$ a new upward shift of the threshold occurs and the level $S_3$ is reached whilst a new counting cycle starts along line $T_3$. However this shift into memory 11 is triggered not by the comparison process but by the output F of counter 13 whose content has reached a value $n+N$, which signifies the completion of one entire message cycle. The completion of an entire cycle without any further upward shift of the threshold level indicates that the message is probably synchronized, and thus the instant $t_3$ terminates the search phase of the synchronizing system.

Starting from instant $t_3$, since the threshold level remains at the value $S_4$, equal to the value which the correlation signal had at the moment $t_3$, the counter goes through normal counting cycles, ordering new memorizations at the instant $t_4$ and $t_5$. Since the correlation signal may change at the end of the counting cycles, the new threshold follows the levels $S_4$ and $S_5$. Similarly, at $T_6$, the counter orders a new memorization which brings the threshold to the value $S_6$. At the instant $T_7$ a high value for the correlation signal, exceeding the value $S_6$, is obtained. The comparator orders this value to be stored in the memory which puts the system back in the search phase. Between times $t_3$ and $t_7$, the system only checks that the threshold of the correlation signal has not been exceeded; this is, therefore, a checking phase. If this phase lasts for a sufficient number of cycles, as indicated by the pulses supplied at the output F, the obtained synchronization may be regarded as sufficiently reliable and the exploitation of the metering groups may start.

If the correlation signal suddenly takes on a value higher than that which has been memorized, as has been, for example, the case at instant $t_7$, and if this should occur one or more times, the exploitation phase is interrupted and the correlator system starts a fresh searching phase.

The system according to the invention has the advantage of a great rapidity in the acquisition of the identification signal group, which is particularly valuable if the telemetering signals are for immediate use.

During the checking phase, the lowering of the correlation signal level remains without effect on the synchronization which is controlled by the counter. Nevertheless, the threshold follows this lowering so as to start a new search phase as soon as the correlation signal level starts rising again.

What is claimed is:

1. A variable threshold correlator for identifying a predetermined group of signals, cyclically repeated at regular time intervals within a continuous flow of information signals, comprising: correlator means having an output, for cross-correlating said predetermined group of signals with said continuous flow of information signals to provide a correlation signal whose instantaneous level reflects the degree of correlation between said group of signals and said continuous flow of information signals; storing means for storing said correlation signal, said storing means having a write input and an output; comparator means having a first input coupled to said correlator means output, a second input coupled to said storing means output and an output for providing a control signal upon said instantaneous correlation signal level at said correlator means output exceeding said correlation signal level stored in said storing means; delayed pulse generating means having a pulse repetition rate equal to said time interval, including means coupled to said comparator means output and controlled by said control signal for resetting it to zero each time said control signal is generated, said generating means having an output; and logical gating means connected between said correlator means output and said write input for applying said correlation signal to said storing means, said gating means having a first control input coupled to said comparator output and a second control input coupled to said delayed pulse generating means output, for controlling the passage of said correlation signal into said storing means upon a signal being applied to at least one of said first and second control inputs.

2. A variable threshold correlator system as claimed in claim 1, wherein said signals of said group are digits and said information signals form a continuous flow of digits.

3. A variable threshold correlator system as claimed in claim 2, wherein said time interval comprises a predetermined number of digits, said flow of information digits being supplied in synchronism with a train of timing pulses; said pulse generating means being a ring counter having a shift input for receiving said timing pulses and comprising a number of stages substantially equal to said number.

4. A variable threshold correlator system as claimed in claim 1, further comprising an erase input in said storing means, and OR-gate means having an output coupled to said erase input and two inputs respectively connected to said comparator means output and to said delayed pulse generating means output.

5. A variable threshold correlator system as claimed in claim 1, wherein said logical gating means comprise: a first AND-gate, having a first input, coupled to said comparator means output, a second input, coupled to said correlator means output, and an output; a second AND-gate having a third input, coupled to said delayed pulse generating means output, a fourth input coupled to said correlator means output, and an output; and an OR-gate, having two inputs respectively coupled to said AND-gates outputs and an output coupled to said write input.

6. A variable threshold correlator system according to claim 2, wherein said correlator means comprise a shift register having a shift input for receiving said timing pulses and a signal input for receiving said information signal flow; said register having a plurality of outputs respectively coupled to a plurality of coincidence gates for comparing the digits of said group to the digits of said information signal flow; said coincidence gates having outputs coupled to a summing circuit; said circuit supplying said correlation signal.

References Cited

UNITED STATES PATENTS

| | | | |
|---|---|---|---|
| 3,001,176 | 9/1961 | Ingham | 340—146.1 |
| 3,065,302 | 11/1962 | Kaneko | 340—147 |
| 3,308,434 | 3/1967 | Glasson et al. | 340—147 |
| 3,376,411 | 4/1968 | Montani et al. | 235—181 |

MALCOLM A. MORRISON, Primary Examiner

FELIX D. GRUBER, Assistant Examiner

U.S. Cl. X.R.

235—150.3; 340—146.1, 147, 149